Dec. 28, 1937.     W. J. HOGG     2,103,462
CHASER SUPPORTING BLOCK
Filed July 24, 1936
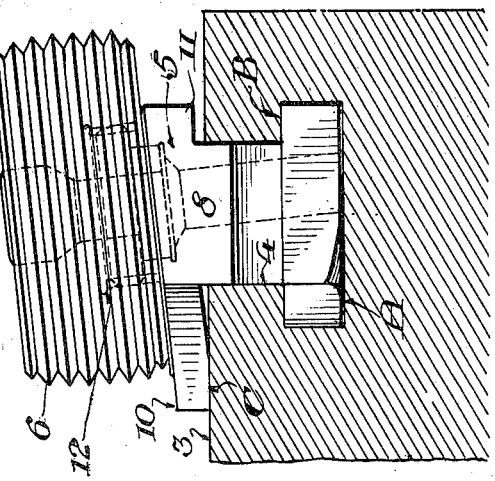
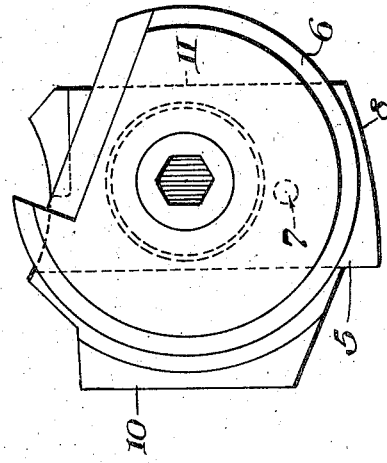
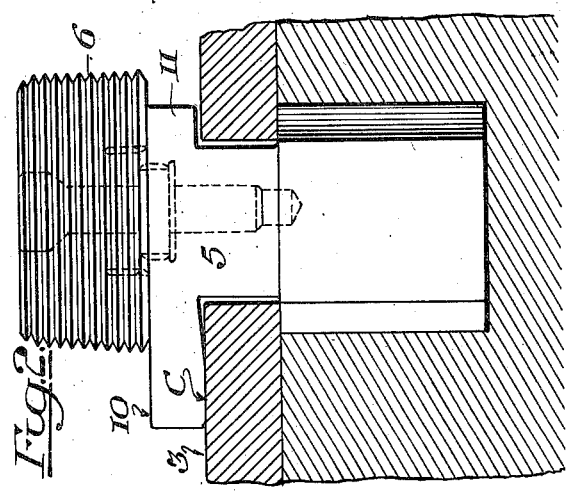
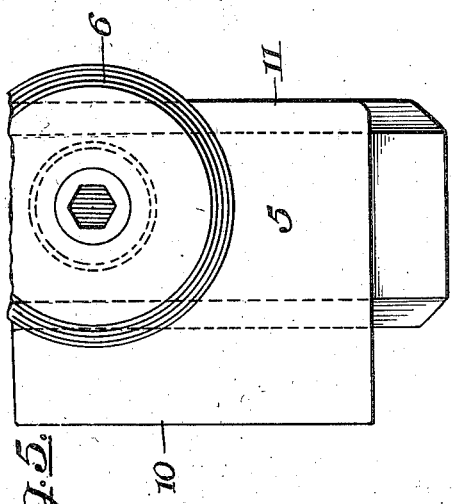
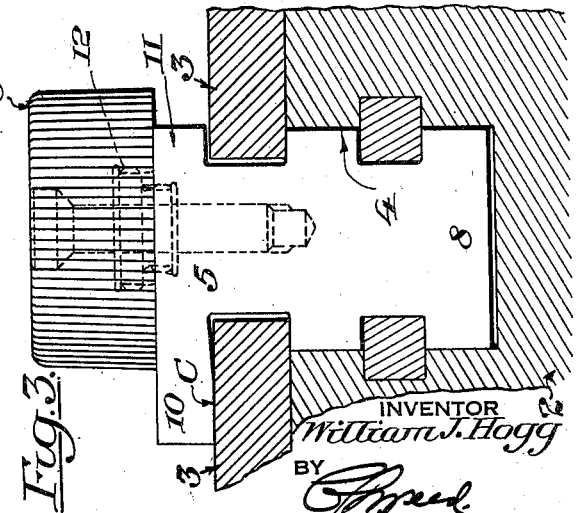
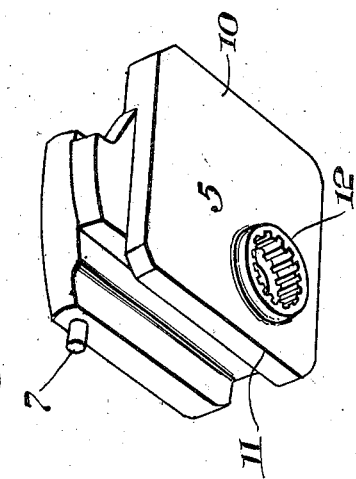
INVENTOR
William J. Hogg
BY
ATTORNEY Patented Dec. 28, 1937

2,103,462

UNITED STATES PATENT OFFICE 2,103,462

CHASER SUPPORTING BLOCK

William James Hogg, Cleveland, Ohio, assignor to The National Acme Company, Cleveland, Ohio, a corporation of Ohio Application July 24, 1936, Serial No. 92,355

14 Claims. (Cl. 10—103)

This invention has to do with chaser supporting blocks for dies and taps and particularly to that form of block constructed to carry circular chasers, the object of the invention being to provide an improved radially shiftable chaser carrying block which will more efficiently support the circular chaser or cutter and prevent the tipping or tilting thereof under the cutting strain and which will effectively take the cutting strain in a direction opposite to the cut.

A further object of the invention is the provision of an improved circular chaser supporting block that will have an extensive bearing upon the outer or front face of the die body instead of only on the inside thereof as heretofore, whereby the bearing surface of the block on the front face of the body will take the strain of the cutter and so support the entire chaser block regardless of its length or width directly on the face of the die body and thus give full support to the circular chaser during its cutting operation.

Heretofore it has been the practice to make the chaser blocks of T-shaped form such as shown in Fig. 14 of my prior Patent No. 1,952,205, of March 27th, 1935, or of U-shaped form, these formations being for the purpose of guiding the blocks in the radial slots of the die or tap body. However, in those forms of chaser blocks, the bearing, and consequently the strain of the chasers during the cutting operation come interiorly of the die body resulting in the tipping or tilting of the chaser under cutting strain, whereas, in the present improved block, it will be observed that, in addition to this interior guiding of the chaser carrier or block, it is also supported and guided on the front face of the body by reason of the wing support or extension and this materially relieves the cutting pressure at A and B, see Fig. 1, thus permitting an easier movement of the carrier or block when under cutting pressure. This easier movement is an advantage when the die or tap is used for taper threading or at any time when the chaser carriers or blocks have to slide in the slots during threading and also allows the chaser carrier or block to move easier when the die is at the opening position or the tap is at the closing position at the end of the cut and the chasers have to be shifted away from the threads.

Furthermore, by reason of this improved construction, it is possible to use a larger serrated bushing on which to set the chasers so that they may be set farther ahead or behind the center of the slot.

In the drawing accompanying and forming a part of this specification, Fig. 1 illustrates this improved chaser carrier or block having one form of radial guides co-operating with the radial slots of the die body.

Fig. 2 illustrates a chaser block with a different form of guide.

Fig. 3 illustrates a chaser block of another form of guide, all of the blocks in the several figures, however, having the wing extension to give increased bearing on the front face of the die body and for supporting the circular chasers in the opposite direction to that in which the chasers are cutting, thereby preventing any tipping or tilting of the chaser.

Fig. 4 is a perspective view of a block.

Fig. 5 is a front view of Fig. 2, and

Fig. 6 is a front view of Fig. 1.

Similar characters of reference indicate the corresponding parts in the several views.

Before explaining in detail the present improvement and mode of operation thereof, I desire to have it understood that the invention is not limited to the details of construction and arrangement of parts illustrated in the accompanying drawing, since the invention is capable of other embodiments, and that the phraseology employed is for the purpose of description and not of limitation.

The chaser blocks herein shown and described are intended for use with circular chasers carried by dies and taps such as shown in my prior Patent No. 1,952,205 hereinbefore referred to, and my contemporaneously pending application, Serial Number 756,229, filed December 6th, 1934, a detailed description thereof, therefore, being deemed unnecessary, it being sufficient to say that the die body 2 is provided in the rear of its front face 3 with a plurality of radially located slots or recesses 4 forming guides or guide-ways, for positioning and guiding the circular chaser carrying blocks.

Each pair of these radially located recesses is formed for the reception of a one-piece correspondingly shaped chaser block 5, to the front face of which the circular chasers 6 are suitably secured.

Each of the chaser blocks when used with a die is provided with a pin 7 projecting into a circularly formed slot of the die body in which is located a spring and a headed plunger in position to engage this pin of the chaser block, thereby to shift the block and its chaser outwardly when the chasers are released by the means or cap provided for that purpose and which is also effective to hold the chaser blocks with their cam faces in engagement with the cams of the cap so that, by this spring, the chasers are opened or released at the proper time.

Each of the chaser blocks when used with a die is also provided with what is usually designated as a land surface 8 curved circumferentially of the die but straight in the direction of the depth of the die for co-operation with a cam-formed surface of the cap or housing whereby on the relative rotation of the body and cap the chasers are adjusted to make the proper cut.

In the rear of this land surface, the chaser blocks are provided with an inclined or cam surface co-operating with the cap whereby when the cap is moved forward the chasers will be set or closed.

In the present improvement, the chaser block 5 having the radial guides is provided at the front thereof with oppositely extending portions 10 and 11, one of these portions, as 10, having increased bearing on the front face of the die body and forming a wing extension having its rear bearing face at an angle to its chaser bearing front face and also preferably at an angle to a portion of its rear face, not only giving increased bearing on the front face of the die body but forming a support for the chaser to take the cutting strain thereof in the direction opposite to the cut, thus giving full support to the circular chaser during its cutting operation and transmitting the strain of the cutter to the front face of the die body and so relieving the strain thereof at the points A and B, Fig. 1, where, heretofore, it has always come. This wing extension is shown with its bearing on the body as substantially greater transversely of the direction of its extension.

By reason of this construction, the tilting or tipping of the chaser, which has been found a serious disadvantage heretofore, is prevented. In the old forms of chaser blocks, strain on the cutter had a tendency to rock or tip the block carrying the chaser since the major portion of the bearing of the block on the body came at the points A and B, Fig. 1, whereas, in this improved block, this bearing is relieved at A and B and primarily comes at C on the front face of the die body. By reason of this wing extension or increased bearing surface, a larger bearing surface immediately back of the circular chaser is obtained where most of the strain comes, the pressure coming on the front face of the wing support of the block and transmitted directly to the point C of the block where it bears on the front face of the die body itself so that support for the circular chaser in the present improvement comes largely upon the outer face of the die body rather than upon the inside thereof as formerly. Thus, the entire chaser block is supported regardless of its length or width directly on the front face of the die body and gives full support to the chaser during its cutting operation and so prevents the tilting or tipping thereof, resulting in a more accurate cutting of the threads.

The form of circular chaser which is used is shown in the patent hereinbefore referred to and a detailed description thereof is, therefore, not deemed necessary.

The front face of the chaser block is provided with a serrated pilot opening 12 for the reception of a serrated bushing similar to that shown and described in my prior Patent No. 1,923,265, of August 22nd, 1933, and which, by reason of the wing extension, may be larger than heretofore, thus enabling the chasers to be set farther ahead or behind the center of the slot.

The front face of each supporting block is inclined transversely thereof whereby the chasers will be angularly set or inclined to the front face of the die body so that while the grooves of the chasers are cut circularly straight and not spirally, they yet have the effect of spirally cut grooves.

The front face of the die blocks thus being formed on an angle in relation to the front face of the die body gives the proper angular setting to the circular chasers and controls the proper cutting edge and clearance thereof. All four chasers, when this number is used, are formed exactly the same and all the chasers are machined exactly the same until the last operation when the back faces of the chasers are ground to suit the position of the cutting edge and consequently, the position of the circular chaser endwise will always remain the same with relation to the top point of the thread.

Therefore, each chaser is ground during the last operation on its back face to suit the position of the cutting edge in the die body, a little more being ground off the back of one chaser than off the back of another. This grinding, however, is in a straight direction or plane and does not give the angularity of the chaser relative to the body as this is obtained by the angularity of the front face of the chaser blocks. However, it does give the different positions of the chasers.

From the foregoing, it will be observed that I have provided an improved circular chaser carrying block having a pair of oppositely located projections overlapping the front face of the die body, one of which forms a wing extension to give increased bearing upon the front face of the die body and increased support to the rear face of the circular chaser which is mounted on the front face of the block and which wing extension is located opposite to the cutting point of the chaser and that the front face of this die block and its wing extension is inclined transversely to the radial movement of the chaser in the block to give the proper inclined position to the chaser and that, in the rear of this wing extension, the block is provided with radial guides or guide-ways for co-operation with similarly formed guides or guide-ways located in the die body, one of which, at the rear of the wing extension is shown having less width depthwise of the block.

It is to be understood that, by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made or all of the modes of its use,

I claim:

1. A radially shiftable chaser carrying block for the reception of a circular chaser on the front face thereof and having a plurality of lateral projections at opposite sides of the block forming a pair of oppositely located radial guide-ways rearwardly of the front thereof, one of the projections at the front of the block extending beyond the other projections to form a wing extension engaging the chaser to its outer periphery and also the front face of the die body to give increased support to the circular chaser and increased bearing on the front face of the die body, said bearing being substantially greater transversely of the direction of its extension.

2. A radially shiftable chaser carrying block for the reception of a circular chaser on the front face thereof and having a plurality of lateral projections at opposite sides of the block forming a pair of oppositely located radial guide-ways rearwardly of the front thereof, one of the projections at the front of the block extending beyond the other projections to form a wing extension to give increased support to the circular chaser and increased bearing on the front face of the die body, said projecting bearing portion or extension having its front face inclined transversely to the radial direction of movement of the block in the die body, said bearing being substantially greater transversely of the direction of its extension.

3. A circular chaser carrying block having oppositely located radial guide-ways, one of less width than the other in the direction of the depth of the block and including a lateral projection or extension at the front forming a wing support for the chaser and engaging the chaser to its outer periphery and also the front face of the die body thereof to take the cutting strain thereof in a direction opposite to the cut and increase the bearing of the block upon the front face of the die body.

4. A circular chaser carrying block having oppositely located radial guide-ways, one of less width than the other in the direction of the depth of the block and including a lateral projection or extension at the front forming a wing support for the chaser and engaging the chaser to its outer periphery and also the front face of the die body thereof to take the cutting strain thereof in a direction opposite to the cut and increase the bearing of the block upon the front face of the die body, said projecting bearing portion or extension having its front face inclined transversely to the radial direction of movement of the block in the die body.

5. A circular chaser carrying block having lateral projections at opposite sides forming radial guide-ways rearwardly of the front thereof, one of said lateral projections located at the front of the block to form a wing extension having an increased bearing on the front face of the die body and giving increased bearing to the circular chaser in a direction opposite to the strain of the cut, said wing extension having a part of its rear face located at an angle to its chaser bearing face.

6. A radially shiftable chaser carrying block for the reception of a circular chaser on the front face thereof and having a plurality of lateral projections at opposite sides of the block forming a pair of oppositely located radial guide-ways rearwardly of the front thereof, the projection opposite to the cutting portion of the chaser extending beyond the other projections to form a wing extension to give increased support to the circular chaser and increased bearing on the front face of the die body, said wing extension having a part of its rear face located at an angle to its chaser bearing face.

7. A circular chaser carrying block having a plurality of lateral oppositely extending portions, a pair thereof at the front of the block together having greater lateral extension than those located in the rear of the front, one of said front pair having greater lateral extension than the other thereby forming a wing support for the chaser to take the cutting strain thereof in a direction opposite to the cut and increase the bearing of the block upon the front face of the die body, said wing support having a portion of its rear face located at an angle to its chaser bearing face.

8. A circular chaser carrying block having a plurality of lateral oppositely extending portions, a pair thereof at the front of the block together having greater lateral extension than those located in the rear of the front, one of said front pair having greater lateral extension than the other thereby forming a wing support for the chaser to take the cutting strain thereof in a direction opposite to the cut and increase the bearing of the block upon the front face of the die body, said wing support having its front face parallel to a portion of the rear face and at an angle to the remaining portion thereof, the front face of the block having a projecting pilot.

9. A circular chaser carrying block having a plurality of lateral oppositely extending portions, a pair thereof at the front of the block together having greater lateral extension than those located in the rear of the front, one of said front pair having greater lateral extension than the other thereby forming a wing support for the chaser to take the cutting strain thereof in a direction opposite to the cut and increase the bearing of the block upon the front face of the die body, said wing support having its front face parallel to a portion of the rear face and at an angle to the remaining portion thereof, the front face of the block having a projecting pilot provided with a serrated opening.

10. A circular chaser carrying block having a plurality of lateral oppositely extending portions, a pair thereof at the front of the block together having greater lateral extension than those located in the rear of the front, one of said front pair having greater lateral extension than the other thereby forming a wing support for the chaser to take the cutting strain thereof in a direction opposite to the cut and increase the bearing of the block upon the front face of the die body, said wing support having its front face parallel to a portion of the rear face and at an angle to the remaining portion thereof, the front face of the block having a projecting pilot located laterally of the axial center of the block.

11. A circular chaser carrying block having a plurality of lateral oppositely extending portions, a pair thereof at the front of the block together having greater lateral extension than those located in the rear of the front, one of said front pair having greater lateral extension than the other thereby forming a wing support for the chaser to take the cutting strain thereof in a direction opposite to the cut and increase the bearing of the block upon the front face of the die body, said wing support having its front face parallel to a portion of the rear face and at an angle to the remaining portion thereof, the front face of the block having a projecting pilot located laterally of the axial center of the block and provided with a serrated opening.

12. A circular chaser carrying block having a plurality of lateral oppositely extending portions, a pair thereof at the front of the block together having greater lateral extension than those located in the rear of the front, one of said front pair having greater lateral extension than the other thereby forming a wing support for the chaser to take the cutting strain thereof in a direction opposite to the cut and increase the bearing of the block upon the front face of the die body, the distance between the projections at one side of the block being less than that between the projections at the other side.

13. A chaser carrying block for the reception of a circular chaser on the front face thereof and having oppositely located radial guides and also having a projection at the front of the block forming an elongated wing extension to give increased support to the circular chaser and increased bearing on the front face of the die body, said block and its wing extension engaging the chaser from adjacent to its axis to the outer periphery of the chaser, said wing extension having a plurality of rear faces of different angularity.

14. A chaser carrying block for the reception of a circular chaser on the front face thereof and having oppositely located radial guides and also having a rectangular formed projection at the front of the block forming an elongated wing extension to give increased support to the circular chaser and increased bearing on the front face of the die body, said block and its wing extension engaging the chaser from adjacent to its axis to the outer periphery of the chaser, said wing extension having a plurality of rear faces of different angularity.

WILLIAM JAMES HOGG.